United States Patent
Ertel et al.

(10) Patent No.: US 7,317,190 B2
(45) Date of Patent: Jan. 8, 2008

(54) RADIATION ABSORBING X-RAY DETECTOR PANEL SUPPORT

(75) Inventors: Jason R. Ertel, Waukesha, WI (US); Bamidele H. Ali, Brookfield, WI (US); Michael J. Utschig, Wauwatosa, WI (US); James Z. Liu, Glenview, IL (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 10/711,554

(22) Filed: Sep. 24, 2004

(65) Prior Publication Data

US 2006/0065846 A1   Mar. 30, 2006

(51) Int. Cl.
*G01T 1/24* (2006.01)
*G21F 3/00* (2006.01)
*G21F 3/04* (2006.01)

(52) U.S. Cl. .............. 250/370.11; 250/515.1; 250/517.1

(58) Field of Classification Search ........ 250/370.08, 250/370.09, 370.11, 370.01, 515.1, 517.1; 378/92, 114
See application file for complete search history.

(56) References Cited

U.S. PATENT DOCUMENTS

| | | | |
|---|---|---|---|
| 5,103,092 A | | 4/1992 | Takahashi et al. |
| 5,262,871 A | | 11/1993 | Wilder et al. |
| 5,281,803 A | | 1/1994 | Ishizuka |
| 5,303,282 A | * | 4/1994 | Kwasnick et al. .......... 378/147 |
| 5,508,740 A | | 4/1996 | Miyaguchi et al. |
| 5,514,873 A | | 5/1996 | Schulze-Ganzlin et al. |
| 5,581,592 A | * | 12/1996 | Zarnoch et al. ............. 378/154 |
| 5,608,774 A | | 3/1997 | Polichar et al. |
| 5,650,626 A | * | 7/1997 | Trauernicht et al. ... 250/370.09 |
| 5,661,309 A | | 8/1997 | Jeromin et al. |
| 5,693,948 A | | 12/1997 | Sayed et al. |
| 5,715,292 A | | 2/1998 | Sayag et al. |
| 5,773,832 A | | 6/1998 | Sayed et al. |
| 5,784,435 A | | 7/1998 | Figurski |
| 5,811,790 A | | 9/1998 | Endo et al. |
| 5,828,726 A | | 10/1998 | Polichar et al. |

(Continued)

FOREIGN PATENT DOCUMENTS

JP   11271454   10/1999

(Continued)

*Primary Examiner*—Dave Porta
*Assistant Examiner*—Faye Boosalis
(74) *Attorney, Agent, or Firm*—Ziolkowski Patent Solutions Group, SC (57) ABSTRACT

An x-ray detector panel support is disclosed that is formed with radiation absorbing material to reduce the reflection of x-rays off anything behind the scintillator, which may include the geometry of the panel support, the electronics, and the back cover of the x-ray detector. The absorbing material may take the form of a discrete layer secured to or otherwise disposed within the panel support. The radiation absorbing material may also be mixed with the base materials used to fabricate the panel support. As such, when the panel support is formed, it includes radiation absorbing components. The radiation absorbing material may include lead, barium sulfate, tungsten, as well as other materials. The panel support is constructed to inhibit the detection of backscattered x-rays without significantly increasing the size or weigh of the x-ray detector. The panel support is applicable with stationary or fixed as well as portable x-ray detectors.

22 Claims, 5 Drawing Sheets

U.S. PATENT DOCUMENTS

| | | |
|---|---|---|
| 5,903,052 A | 5/1999 | Chen et al. |
| 5,909,478 A | 6/1999 | Polichar et al. |
| 5,962,856 A | 10/1999 | Zhao et al. |
| 5,965,872 A | 10/1999 | Endo et al. |
| 6,049,074 A | 4/2000 | Endo et al. |
| 6,127,714 A | 10/2000 | Mochizuki |
| 6,208,708 B1 | 3/2001 | Hoheisel et al. |
| 6,232,607 B1 | 5/2001 | Huang |
| 6,239,439 B1 | 5/2001 | Itabashi et al. |
| 6,255,638 B1 | 7/2001 | Eräluoto et al. |
| 6,323,891 B1 | 11/2001 | Kitani et al. |
| 6,331,705 B1 | 12/2001 | Eisen et al. |
| 6,333,963 B1 | 12/2001 | Kaifu et al. |
| 6,344,652 B1 | 2/2002 | Shoji |
| 6,398,409 B1 | 6/2002 | Brooks |
| 6,459,132 B1 | 10/2002 | Mochizuki |
| 6,469,312 B2 | 10/2002 | Agano |
| 6,475,824 B1 | 11/2002 | Kim |
| 6,552,319 B2 | 4/2003 | Pyyhtiä et al. |
| 6,667,480 B2 | 12/2003 | Kajiwara et al. |
| 6,700,126 B2 | 3/2004 | Watanabe |
| 6,707,880 B2 | 3/2004 | Yamayoshi |
| 6,714,623 B2 | 3/2004 | Sako et al. |
| 6,723,592 B2 | 4/2004 | Shih |
| 2002/0005490 A1 | 1/2002 | Watanabe |
| 2002/0150214 A1 | 10/2002 | Spahn |
| 2002/0181659 A1 | 12/2002 | Watanabe et al. |
| 2003/0031296 A1 | 2/2003 | Hoheisel |
| 2004/0094732 A1* | 5/2004 | Yonekawa ............ 250/589 |

FOREIGN PATENT DOCUMENTS

| | | | |
|---|---|---|---|
| JP | 2001099942 | | 4/2001 |
| JP | 2001198116 | | 7/2001 |
| JP | 2001224579 | | 8/2001 |
| JP | 2002006049 | | 1/2002 |
| JP | 2002014170 | | 1/2002 |
| JP | 2002048873 | | 2/2002 |
| JP | 2002125960 | | 5/2002 |
| JP | 2002131437 | | 5/2002 |
| JP | 2003000586 | | 1/2003 |
| JP | 2003010175 | | 1/2003 |
| JP | 2003014854 | * | 1/2003 |
| JP | 2003014862 | | 1/2003 |
| JP | 2003060181 | | 2/2003 |
| JP | 2003334184 | | 11/2003 |

* cited by examiner

RADIATION ABSORBING X-RAY DETECTOR PANEL SUPPORT

BACKGROUND OF THE INVENTION

The present invention relates generally to diagnostic imaging and, more particularly, to a digital radiographic x-ray detector having a radiation absorbing panel support constructed to reduce or eliminate backscatter x-rays during an x-ray exposure of a scan subject.

X-ray imaging is a non-invasive technique to capture images of medical patients for clinical diagnosis as well as inspect the contents of sealed containers, such as luggage, packages, and other parcels. To capture these images, an x-ray source irradiates a scan subject with a fan beam of x-rays. The x-rays are then attenuated as they pass through the scan subject. The degree of attenuation varies across the scan subject as a result of variances in the internal composition of the subject. The attenuated energy impinges upon an x-ray detector designed to convert the attenuating energy to a form usable in image reconstruction. A control system reads out electrical charge stored in the x-ray detector and generates a corresponding image. For a conventional, screen film detector, the image is developed on a film and displayed using a backlight.

Increasingly, flat panel, digital x-ray detectors are being used to acquire data for image reconstruction. Flat panel detectors are generally constructed as having a scintillator, which is used to convert x-rays to visible light that can be detected by a photosensitive layer. The photosensitive layer includes an array of photosensitive or detection elements that each store electrical charge in proportion to the light that is individually detected. Generally, each detection element has a light sensitive region and a region comprised of electronics to control the storage and output of electrical charge. The light sensitive region is typically composed of a photoconductor, and electrons are released in the photoconductor when exposed to visible light. During this exposure, charge is collected in each detector element and is stored in a capacitor situated in the electronics region. After exposure, the charge in each detector element is read out using logic controlled electronics.

Each detector element is conventionally controlled using a transistor-based switch. In this regard, the source of the transistor is connected to the capacitor, the drain of the transistor is connected to a readout line, and the gate of the transistor is connected to a scan control interface disposed on the electronics in the detector. When negative voltage is applied to the gate, the switch is driven to an OFF state, i.e. no conduction between the source and drain. On the other hand, when a positive voltage is applied to the gate, the switch is turned ON resulting in connection of the source to the drain. Each detector element of the detector array is constructed with a respective transistor and is controlled in a manner consistent with that described below.

Specifically, during exposure to x-rays, negative voltage is applied to all gate lines resulting in all the transistor switches being driven to or placed in an OFF state. As a result, any charge accumulated during exposure is stored in each detector element capacitor. During read out, positive voltage is sequentially applied to each gate line, one gate at a time. In this regard, only one detector element is read out at a time. A multiplexer may also be used to support read out of the detector elements in a raster fashion. An advantage of sequentially reading out each detector element individually is that the charge from one detector element does not pass through any other detector elements. The output of each detector element is then input to a digitizer that digitizes the acquired signals for subsequent image reconstruction on a per pixel basis. Each pixel of the reconstructed image corresponds to a single detector element of the detector array.

As described above, indirect detection, digital x-ray detectors utilize a layer of scintillating material, such as Cesium iodide (CsI), to convert incident radiation to visible light that is detected by light sensitive regions of individual detector elements of a detector array. Generally, the transistor controlled detector elements are supported on a thin substrate of glass. The substrate, which supports the detector elements as well as the scintillator layer, is supported by a panel support. The panel support is not only designed to support the detector components, but also isolates the electronics that control the detector from the image detecting components. The electronics are supported by the panel support and enclosed by the back cover.

During data acquisition, and particularly applicable during higher dose acquisitions, x-rays may pass through the detector layer, glass substrate, panel support, and motherboard. These x-rays then reflect back off of whatever is found behind the glass substrate. This often is the electronics, panel support, and the back cover as well as structures external to the detector. This phenomenon is generally referenced "backscatter" and can introduce artifacts into the reconstructed image. That is, the "backscattered" x-rays may be detected by the scintillator, converted to light, and detected by the photosensitive regions in the detector elements. As a result, the reconstructed image may include features of the detector electronics, panel support, or back cover and increase the difficulty or create an image artifact, which may be misdiagnosed by the radiologist or inspector in discerning the internal make-up of the subject or object.

Therefore, it would be desirable to design an apparatus that reduces or eliminates backscatter and the subsequent detection of backscattered x-rays during x-ray imaging of a subject.

BRIEF DESCRIPTION OF THE INVENTION

The present invention is directed to a radiation absorbing panel support for an x-ray detector that overcomes the aforementioned drawbacks.

An x-ray detector panel support is disclosed that is formed with radiation absorbing material to reduce the reflection of x-rays off the back cover of the x-ray detector. The absorbing material may take the form of a discrete layer disposed within the panel support. The radiation absorbing material may also be mixed with the base materials used to fabricate the panel support. As such, when the panel support is formed, it includes radiation absorbing components. The radiation absorbing material may include lead, barium sulfate, tungsten, as well as other atomically heavy materials. The panel support is constructed to inhibit the detection of backscattered x-rays without significantly increasing the size or weight of the x-ray detector. The panel support is applicable with fixed as well as portable x-ray detectors.

Therefore, in accordance with one aspect, the present invention includes a radiographic detector panel support. The panel support has a body composed of a composite material sufficient to structurally support components of a radiographic detector. The panel support also has radiation absorbing material interspersed within the body.

In accordance with another aspect of the present invention, an x-ray detector system is disclosed and includes a scintillator configured to convert radiographic energy to light and a detector array having a plurality of detector elements to detect light from the scintillator. A control board is provided as having a plurality of electronic components to control the detector array during data acquisition and data readout. The x-ray detector system further has a panel support disposed between the detector array and the control board. The panel support is at least partially formed of radiation absorbing material.

According to another aspect, the present invention includes a method of manufacturing a flat panel x-ray detector. The method includes providing a bulk of non-x-ray absorbing material designed to support internal components of an x-ray detector. The non-x-ray absorbing material is capable of supporting the internal components when a deflective force is applied to the x-ray detector. The method further includes incorporating x-ray absorbing material into the bulk and forming an x-ray detector panel support having non-x-ray and x-ray absorbing materials.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to a flat panel, solid-state, indirect detection, portable digital x-ray detector for use with a mobile x-ray imaging system. However, the present invention is equivalently applicable with other types of x-ray detectors including direct detection digital detectors. Additionally, the present invention may be used with stationary or fixed room x-ray imaging systems. Further, the present application makes reference to an imaging "subject" as well as an imaging "object". These terms are not mutually exclusive and, as such, use of the terms is interchangeable and is not intended to limit the scope of the appending claims.

Figure 1:
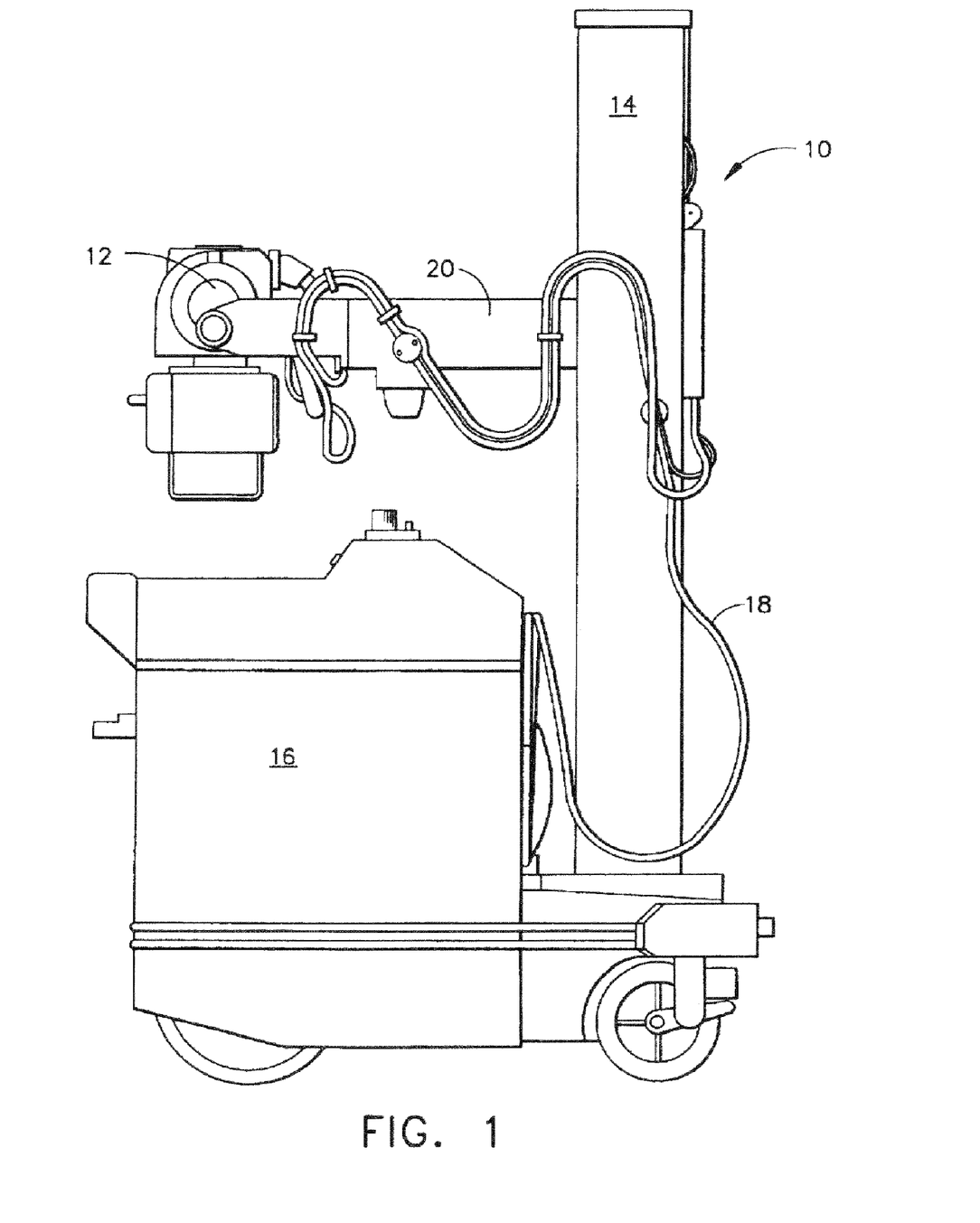
FIG. 1 is a pictorial view of an exemplary mobile x-ray imaging system.

Referring now to FIG. 1, an exemplary mobile x-ray imaging system 10 applicable with a portable x-ray detector incorporating the present invention is shown. An x-ray source 12 is mounted or otherwise secured to an end of horizontal arm 20. Arm 20 allows the x-ray source 12 to be variably positioned above a subject in such a manner so as to optimize irradiation of a particular area of interest. The x-ray source 12 is typically mounted through a gimbal type arrangement (not shown) in column 14. In this regard, the x-ray source may be rotated vertically from a rest or park position on the mobile x-ray unit base 16 to the appropriate position above the subject in order to take an x-ray exposure of the subject. The rotational movement of column 14 is typically limited to a value of 360 degrees or less to prevent entanglement of high voltage cables 18 used to provide electrical power to the x-ray source 12. Cables 18 may be connected to a utility line source (not shown) or a battery (not shown) in the base 16 to energize the x-ray source 12 as well as other electronic components of the system 10. One skilled in the art will appreciate that system 10 may be equipped or connectable to a display unit (not shown) for the display of images captured from the imaging subject.

Figure 2:
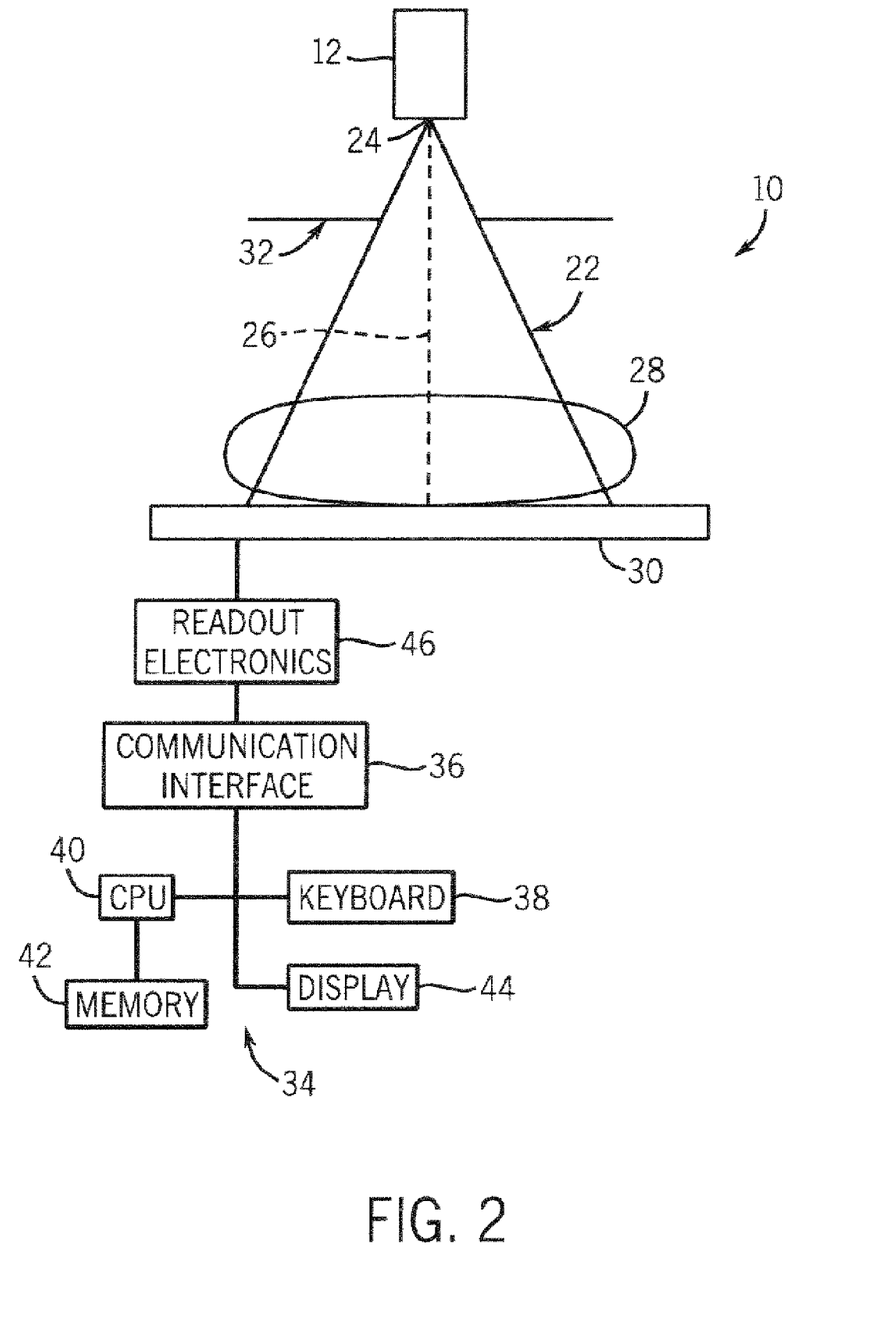
FIG. 2 is a schematic block diagram of the exemplary x-ray imaging system shown in FIG. 1.

Referring now to FIG. 2, a schematic of x-ray imaging system 10 is illustrated. As referenced above, system 10 includes x-ray source 12 designed to project a fan bean of irradiation 22 from focal spot 24 along axis 26 toward an object to be imaged 28. One skilled in the art will appreciate that medical patients as well as luggage, packages, and the like may be non-invasively inspected using the exemplary x-ray imaging system 10. A flat panel digital detector 30 detects x-rays passing through and attenuated by object 28. A collimator assembly 32, schematically shown in FIG. 2 as comprising collimator blades, may be used to collimate the x-ray fan beam 22 to control the scope of irradiation.

A host or scanner interface 34 includes a communication interface 36, a keyboard 38 or other data entry device, a CPU 40, memory 42, and a display unit 44, such a computer monitor, to display reconstructed images of the object. A bus 46 connects the keyboard 38, CPU 40, memory 42, and display unit 44 to the communication interface 36. The CPU may include a microprocessor, digital signal processor, microcontroller, as well as other devices designed to carry out logic and processing operations. Signals corresponding to an x-ray image are read out from flat panel detector 30 via readout electronics 46. While not shown, it is contemplated that the host interface 34 may be connected to a centralized facility via the Internet or communications link for monitoring and maintenance.

Additionally, the readout electronics may read out signals from the flat panel detector across a tethered connection between the detector and the imaging system. It is also contemplated that read out may be achieved across a wireless communication between the detector and imaging system. In this regard, one skilled in the art will appreciate that the imaging system and detector may be equipped with transceivers, antennas, and other operational circuitry to support the wireless transmission of data.

Figure 3:
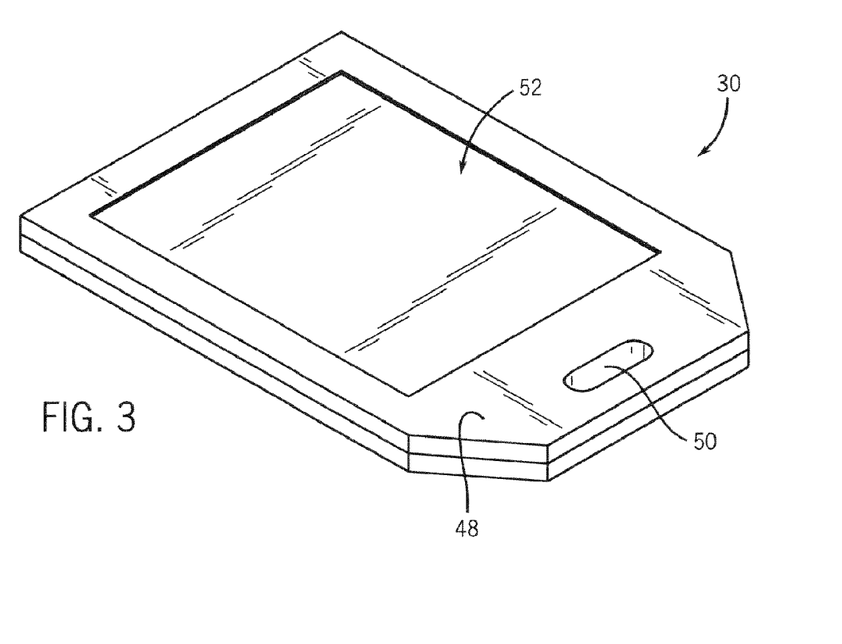
FIG. 3 is a perspective view of a portable, solid-state, flat panel, digital x-ray detector incorporating the present invention.

Referring now to FIG. 3, a perspective view illustrates a portable, flat panel x-ray detector 30 incorporating the present invention. Detector 30 is preferably an indirect detection, solid-state, digital detector that determines x-ray attenuation through an imaging subject from the emission of light by a scintillator that emits light upon the incidence of x-rays. The detector 30 includes a cover 48 formed of lightweight, durable composite material. A handle 50 is incorporated into the cover to support the portability of the detector. As shown, the detector 30 may be constructed without a fixed tether. In this regard, the detector may be connected to a tether (not shown), which is connected to the readout electronics when in use. When not in use, the detector may be easily detached from tether and stored remotely from the imaging system. The top of the cover includes a template 52 that visually defines the surface dimensions of the scintillator layer in the detector. Template 52 is designed to visually assist a user in positioning of the detector for data acquisition.

While the present invention is particularly applicable with indirect detection digital detectors, the present invention may also be implemented with direct detection digital detectors. Direct detection digital detectors utilize a layer of amorphous selenium or similar material photoconductor coupled to a thin film transistor array. X-ray interaction in the selenium layer releases electrons (or electron holes), which are used to form signal directly. An electrode is often used to create an electric field across the selenium layer to minimize the lateral spread of electrons, preserving spatial resolution. In addition to selenium, mercuric iodide, cadmium telluride, and lead iodide may be used. As direct detection digital detectors remain susceptible to backscatter, the present invention is believed to be applicable therewith.

Figure 4:
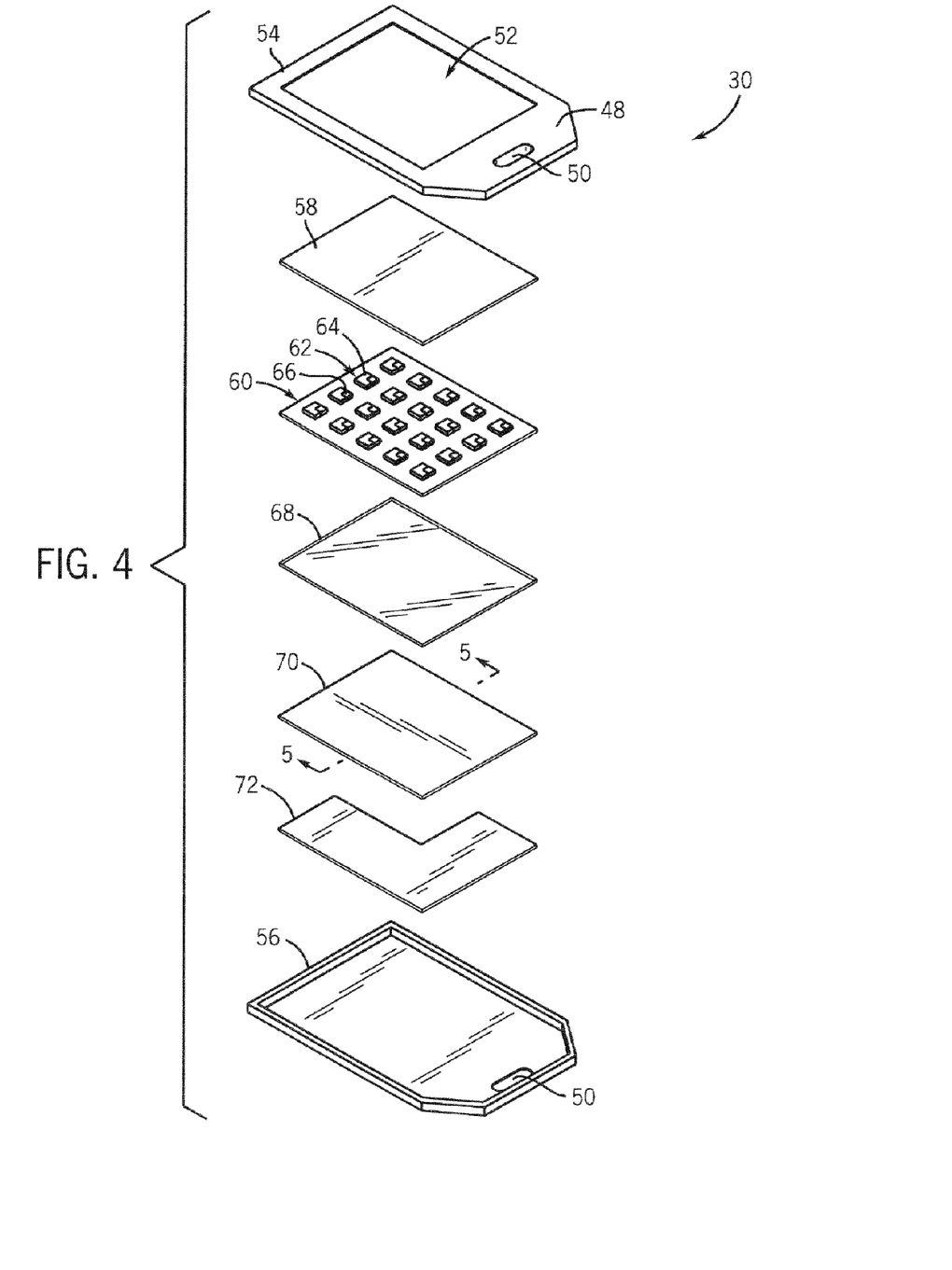
FIG. 4 is an exploded view of the x-ray detector shown in FIG. 3.

Referring now to FIG. 4, an exploded view illustrates the internal composition of detector 30. Detector 30 includes a top cover 54 that along with back cover 56 provides a shell or enclosure for its internal components. Both covers 54, 56 are preferably formed of a composite material sufficient to protect the detector components from fracture when exposed to a load, e.g. 300 lbs. It is noted however that the covers may be fabricated from other materials, such as magnesium. Additionally, covers 54 and 56 may be constructed with bumpers, foam inserts, or other impact absorbing material to inhibit fracturing of the detector components when dropped. When assembled, the top cover 54 is constructed in such a manner that the detector may be placed on a floor and support a standing subject. In this regard, the top cover 54 is designed to minimally deflect when subjected to a load.

Top cover 54 and back cover 56 collective form handle 50 when assembled. The handle supports portability of the detector. Additionally, the detector is constructed to be quickly detached from a tether (not shown) that is used to connect the detector to the scanner during data acquisition and readout. As such, detector 30 may be transported to and from multiple scan stations remote from one another. This is particularly advantageous for emergency rooms and other triage facilities. Further, the portability and detachability of the detector further enhances the mobility of a mobile x-ray imaging system, such as that shown in FIG. 1. It is recognized however that the detector may be fixedly connected to the scanner.

Detector 30 further includes a scintillator layer 58 designed to convert incident x-rays or gamma rays to visible light. Scintillator layer 58, which may be fabricated from CsI or other scintillating material, is designed to emit light proportional to the number and energy of the x-rays received. As such, light emissions will be higher in those regions of the scintillator layer 58 where either more x-rays were received or the energy level of the received x-rays was higher. Since the composition of the subject will attenuate the x-rays projected by the x-ray tube, the energy level of the x-rays impinging upon the scintillator layer will not be uniform across the scintillator layer. This variation in light emission will be used to capture contrast in the reconstructed image.

The light emitted by the scintillator layer 58 is detected by detector elements of a detector element array 60. Each detector element 62 corresponds to a picture element or pixel in the reconstructed image. Each detector element 62 includes a light sensitive or photoconductive region 64 and an electronics region 66. During exposure to x-rays, electrons are released in the light sensitive region 64 in proportion to the light detected in the region 64. The electronics region 66 includes a capacitor (not shown) that stores the electrical charge accumulated by the light sensitive region. After exposure, a thin-film-transistor (not shown) in the electronics region 66 is biased so as to connect the capacitor to readout electronics in the x-ray scanner. Generally, a multiplexer (not shown) is used to control read out of the discrete detector elements in a sequential, raster fashion. In this regard, the output of each detector element is sequentially input to a digitizer for digitization for subsequent image reconstruction.

The thin-film-transistors of the detector elements 62 are supported by a glass substrate 68. Lead lines (not shown) etched in substrate 68 are used for routing of the electrical output of the detector elements as well as applying the biasing voltages to the thin-film-transistors. The glass substrate is generally very thin and fragile. In this regard, as referenced above, the top cover and back cover 54 and 56 are designed with impact absorbing material to help prevent fracturing of the glass substrate. Additionally, as the detector 30 may be used to support a relatively large load during imaging, e.g. imaging of the feet of an average sized adult male, the top cover 54 is further designed to reduce the stress on the detector to further prevent fracturing of the glass substrate.

The glass substrate 68 is supported by a detector panel support 70. Panel support 70 is not only designed to support substrate 68, but is also used to separate the x-ray conversion and light detection components from the electronics 72. As will be described in greater detail below, the panel support 70 is constructed to include radiation absorbing material in addition to structurally supporting material. As will also be described, the radiation absorbing material will negligibly increase the thickness and weight of the detector, if any.

Incorporating radiation absorbing material within the panel support reduces or eliminates the detection of backscattered x-rays. That is, the radiation absorbing material absorbs x-rays passing through the scintillator layer, detector element array, and glass substrate, as well as x-rays that deflect off the back cover of the detector. In this regard, the electronics 72 are not imaged.

The electronics 72, in one embodiment, have an L-shape and is disposed to support the processing and logic control electronics of the detector. The electronics preferably includes LEDs for monitoring operation and diagnostics of the detector. The motherboard may also include temperature sensors for providing feedback as to the temperature of the detector as well as the temperature of the subject. The electronics may also support an accelerometer designed to detect acceleration of the detector and store data accordingly. In this regard, the accelerometer may be used to record the date and time when the detector experienced dramatic increases in acceleration, i.e. when dropped. The electronics may also include various storage devices including flash storage. In a wireless implementation, the electronics may include an antenna and transceiver for wirelessly transmitting data to the x-ray scanner. Additionally, the electronics may include a battery or other DC power source for powering the detector electronics. The electronics are supported by panel support and back cover 56.

Figure 5:
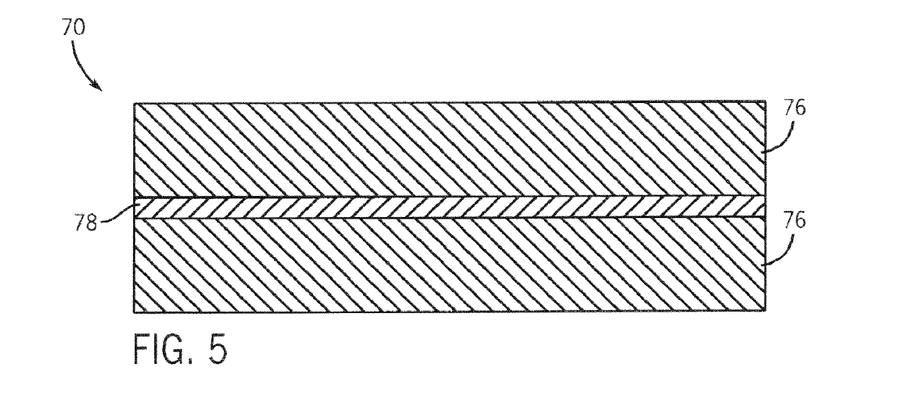
FIG. 5 is a cross-sectional view of the x-ray detector panel support shown in FIG. 4 taken along lines 5-5 thereof.

Referring now to FIG. 5, a cross-sectional view of the x-ray detector panel support 70 taken along lines 5-5 of FIG. 4 illustrates incorporation of radiation absorbing material to reduce x-ray backscatter during data acquisition. The x-ray detector panel support 70 is preferably constructed of lightweight, structurally supporting, non-x-ray absorbing composite material 76 and radiation absorbing material 78. In one embodiment, the radiation absorbing material 78 is sandwiched between two layers of composite material 76. That radiation absorbing material may include lead, tungsten, barium sulfate, and the like. In one embodiment, the panel support has a thickness of 1.0 mm and the layer of radiation absorbing material has a thickness of 0.1 mm. It is recognized that the panel support and radiation absorbing layer may be constructed to have other thicknesses than those listed above. Moreover, while in one preferred embodiment, ten percent of the overall panel support thickness can be attributed to radiation absorbing material; it is contemplated that a ratio of radiation absorbing layer thickness to overall panel support thickness can be more or less than ten percent. Additionally, while only one layer of radiation absorbing material is shown, the present invention contemplates that multiple layers of radiation absorbing material may be used.

It is contemplated that a layer of lead or other radiation absorbing material may be fabricated and connected to a conventional panel support in a sealed manner. However, lead and other radiation absorbing materials are generally brittle when fabricated into extremely thin layers, e.g. 0.1 mm. Additionally, incorporating thicker layers of radiation absorbing material or fabricating the entire panel support out of radiation absorbing material greatly increases the weight of the detector. This is generally undesirable for a portable x-ray detector.

Accordingly, the present invention is also directed to a method of manufacturing of a detector panel support incorporating radiation absorbing material. The panel support may be constructed using one of a number of known fabrication techniques, including, but not limited to chemical vapor deposition, injection molding, and the like. For instance, referring again to FIG. 5, a single structure of non-x-ray absorbing material may be machined to define a planar channel extending through the single structure. The planar channel may then filled with a powder or sealant of radiation absorbing material yielding a panel support with radiation absorbing properties. In another contemplated process, chemical vapor deposition and similar principles may be used to deposit a layer of radiation absorbing material on the surface of a layer of non-radiation absorbing, structurally supporting material. Once a layer of radiation absorbing material is deposited on the layer of non-radiation absorbing material, another layer of non-radiation absorbing material may be sealed against the layer of lead, barium sulfate, tungsten or other radiation absorbing material.

Figure 6:
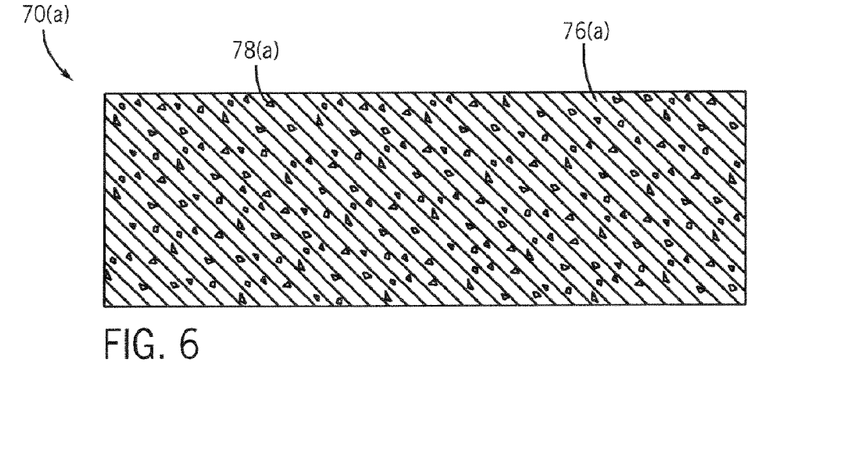
FIG. 6 is a cross-sectional view of the x-ray detector panel support according to another embodiment of the present invention.

It is further contemplated that a panel support may be constructed without discrete radiation absorbing layers, but constructed in such a manner that radiation absorbing particles are disposed homogeneously throughout the panel support. An exemplary construction is illustrated in FIG. 6. As shown, the panel support body 70(*a*) is predominantly formed of non-x-ray absorbing material 76(*a*) with radiation absorbing particles 78(*a*) intermixed therein. Such a construction yields the advantages of a stacked or layered construction, but may be effectively fabricated. Specifically, a powder of radiation absorbing material, such as tungsten, may be mixed with powder of composite material designed to structurally support the detector components. During the mixing process, the radiation absorbing particles and non-radiation absorbing particles are intermixed. Preferably, the mixing process is carried out such that distribution of radiation absorbing material is uniform throughout the mix. The mix is then cured or otherwise fashioned into a single structure. The structure could be shaped after it has been cured using conventional machining techniques or shaped during the curing process. For example, the mix could be liquefied and poured into a mold defining the desired shape of the panel support. After drying, the mold could be removed to yield the x-ray detector panel support capable of absorbing incident x-rays.

Figure 7:
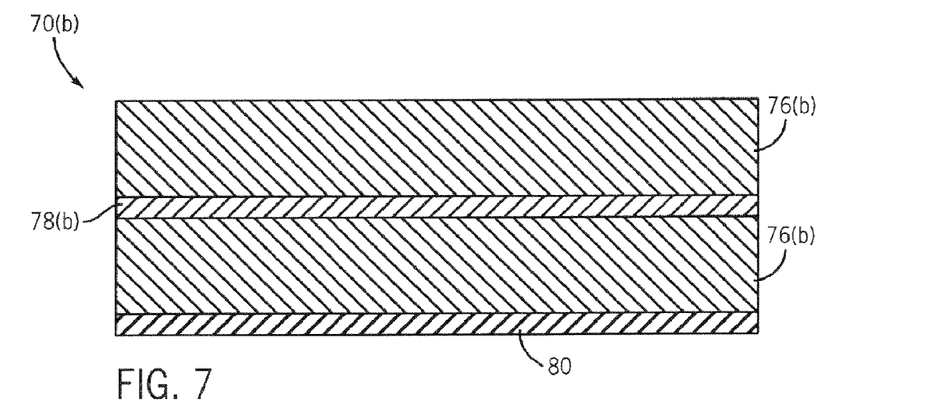
FIG. 7 is a cross-sectional view of an x-ray detector panel support according to yet another embodiment of the present invention.

Referring now to FIG. 7, an alternate x-ray detector panel support 70(*c*) according to the present invention is shown. Panel support 70(*c*) is illustrated in a stacked layer arrangement similar to that shown in FIG. 5; however, panel support 70(*c*) incorporates an insulator layer 80 secured against non-x-ray absorbing, composite layer 76(*c*). Insulator layer 80 is preferably sealed against layer 76(*c*) and is designed to thermally insulate the the electronics of electronics from the scintillator layer and photosensitive elements. Since operation of the scintillator layer and photosensitive elements may be affected by temperature changes, incorporating insulating layer 80, a more constant thermal load is placed on the x-ray conversion and detection components of the detector. In this regard, calibration of the detector is more easily achieved and the detector provides a more constant output. While insulator layer 80 is shown sealed against a panel support having stacked non-x-ray absorbing and x-ray absorbing layers, it is contemplated that an insulator layer may also be sealed to the panel support illustrated in FIG. 6.

The present invention has been described with respect to an x-ray detector panel support capable of absorbing x-rays that pass though the detector components of an x-ray detector to prevent backscatter and subsequent imaging of internal components, i.e. the electronics, of the detector. The panel support may be constructed in a stacked arrangement of layer(s) of radiation absorbing material and layer(s) of non-radiation absorbing material. The panel support may also be constructed in an intermixed fashion such that radiation absorbing particles are present throughout the body of the panel support. The panel support is also constructed such that the radiation material is also capable of enhancing the support characteristics of the non-radiation absorbing material. In this regard, the weight of the panel support and the detector as a whole is negligibly increased, if any. Additionally, since the radiation absorbing material is incorporated into the panel support itself, special handling precautions with respect to a dedicated thin layer of lead or other radiation absorbing material are avoided when compiling the detector.

Therefore, a radiographic detector panel support is presented. The panel support has a body composed of a composite material sufficient to structurally support components of a radiographic detector. The panel also has radiation absorbing material interspersed within the body.

An x-ray detector system is also presented and includes a scintillator configured to convert radiographic energy to light and a detector array having a plurality of detector elements to detect light from the scintillator. A control board is provided as having a plurality of electronic components to control the detector array during data acquisition and data readout. The x-ray detector system further has a panel support disposed between the detector array and the control board. The panel support is at least partially formed of radiation absorbing material.

The present invention is also directed to a method of manufacturing a flat panel x-ray detector. The method includes providing a bulk of non-x-ray absorbing material designed to support internal components of an x-ray detector. The non-x-ray absorbing material is capable of supporting the internal components when a deflective force is applied to the x-ray detector. The method further includes incorporating x-ray absorbing material into the bulk and forming an x-ray detector panel support having non-x-ray and x-ray absorbing materials.

The present invention has been described in terms of the preferred embodiment, and it is recognized that equivalents, alternatives, and modifications, aside from those expressly stated, are possible and within the scope of the appending claims.

What is claimed is:

1. A radiographic detector panel support comprising:
a body composed of a composite material sufficient to structurally support components of a radiographic detector;
radiation absorbing material interspersed within the body; and
wherein the radiation absorbing material has a mass sufficient to prevent detection of radiation reflected off a back cover of the radiographic detector by radiation detecting components of the radiographic detector.

2. The support of claim 1 wherein the radiation absorbing material includes one of a layer of lead and a layer of barium sulfate.

3. The support of claim 1 further comprising a layer of thermal insulating material secured to the body.

4. The support of claim 1 wherein the radiation absorbing material includes tungsten.

5. The support of claim 1 wherein the composite material includes graphite.

6. The support of claim 1 wherein the body is a planar body and is configured to separate scintillation components of a radiographic detector from a control board of electronics of the radiographic detector.

7. An x-ray detector system comprising:
a scintillator configured to convert radiographic energy to light;
a detector array having a plurality of detector elements to detect light from the scintillator;
a control board having a plurality of electronic components to control the detector array during data acquisition and data readout; and
a panel support disposed between the detector array and the control board, the panel support at least partially formed of radiation absorbing material.

8. The x-ray detector system of claim 7 wherein the panel support includes at least one layer of radiation absorbing material.

9. The x-ray detector system of claim 8 wherein the at least one layer has a surface area equivalent to that of the detector array.

10. The x-ray detector system of claim 8 wherein the radiation absorption material includes one of tungsten, lead, and barium sulfate.

11. The x-ray detector system of claim 7 wherein each detector element includes a light sensitive area and an electronics area supported by a glass substrate, and wherein the electronics area includes an electronic switch connected to a capacitive element and the control board.

12. The x-ray detector system of claim 11 wherein the electronic switch includes a thin-film-transistor designed to bias the capacitive element in an energy storage mode during data acquisition and connect the capacitive element to readout electronics of the control board during a readout mode.

13. The x-ray detector system of claim 11 wherein the panel support is further configured to support the glass substrate such that the glass substrate can withstand a point-load of 300 lbs. without fragmentation.

14. The x-ray detector system of claim 7 wherein the scintillator is comprised of Cesium iodide.

15. The x-ray detector system of claim 7 further comprising a cover housing the scintillator, the detector array, the control board, and the panel support, and the cover having a handle to facilitate portability thereof.

16. A method of manufacturing a flat panel x-ray detector comprising the steps of:
providing a bulk of non-x-ray absorbing material designed to support internal components of an x-ray detector and wherein the non-x-ray absorbing material is capable of supporting the internal components when a deflective force is applied to the x-ray detector;
incorporating x-ray absorbing material into the bulk; and
forming an x-ray detector panel support having non-x-ray and x-ray absorbing materials.

17. The method of claim 16 further comprising the steps of:
fashioning a first layer of non-x-ray absorbing material and a second layer of non-x-ray absorbing material from the bulk of non-x-ray absorbing material; and
securing an x-ray absorbing layer to the first and the second layers of non-x-ray absorbing material.

18. The method of claim 17 further comprising the step of bonding the layers of non-x-ray absorbing material and the layer of x-ray absorbing material to one another to form a composite layered structure.

19. The method of claim 17 further comprising the step of:
disposing a glass substrate and detector array on the first layer of non-x-ray absorbing material;
disposing a layer of scintillation material adjacent the detector array;
arranging the first layer and the second layer of non-x-ray absorbing material, the x-ray absorbing layer, the glass substrate and detector array, the layer of scintillation material, and a control board in a stacked arrangement; and
disposing the stacked arrangement in a housing having a handle.

20. The method of claim 16 wherein the non-x-ray absorbing material includes graphite.

21. The method of claim 16 wherein the x-ray absorbing material includes one of lead, tungsten, and barium sulfate.

22. The method of claim 16 further comprising the steps of adding an x-ray absorbing material in powder form to the bulk of non-x-ray absorbing material, mixing the powder of x-ray absorbing material with the non-x-ray absorbing material, and curing the mixture.

* * * * *